United States Patent Office 2,899,420
Patented Aug. 11, 1959

2,899,420

WATER INSOLUBLE MONOAZO DYESTUFFS

Albert Funke, Frankfurt am Main Hochst, and Hans Raab, Leverkusen-Bayerwerk, Germany, assignors to Farbenfabriken Bayer Aktiengesellschaft, Leverkusen-Germany, a corporation of Germany No Drawing. Application July 20, 1954
Serial No. 444,630

Claims priority, application Germany August 4, 1953

2 Claims. (Cl. 260—204)

The present invention relates to new water insoluble monazo dyestuffs, more particularly it relates to monoazo dyestuffs corresponding to the following general formula

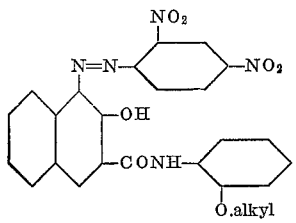

The new dyestuffs are obtained by coupling in usual manner diazotized 1-amino-2,4-dinitrobenzene with an orthoalkoxyarylamide of 2,3-hydroxy-naphthoic acid; if desired, coupling may be carried out in the presence of a substratum. As suitable examples of ortho-alkoxyarylamides of 2,3-hydroxy-naphthoic acid the ortho-anisidide and the ortho-phenetidide may be mentioned. The monoazo dyestuffs thus obtained are red to Bordeaux pigment dyes of very valuable properties such as good fastness to overstriping of lacquers dyed therewith, good fastness to solvents in general and especially excellent fastness to light. On account of these properties the new pigments are particularly suited for the use in oil paints, for graphic printing, further for coloring nitrocellulose and alkyd resin lacquers of which is required that they show a good fastness to overstriping and that the pigments do not sublime as well as for textile printing. In their fastness to light the new dyestuffs excel the pigment dyestuffs known from German Patents 256,999 and 390,627. In German Patent 256,999 there is described the manufacture of water insoluble monoazo dyestuffs by combining diazo compounds of the benzene series containing at least one negative substituent except the sulfonic acid group with arylamides of 2,3-hydroxy-naphthoic acid. Among the numerous examples of this patent there is mentioned also the dyestuff obtained from diazotized 1-amino-2,4-dinitrobenzene and 2,3-hydroxy-naphthoic anilide. The process of the German Patent 390,627 is directed to the manufacture of water insoluble monoazo dyestuffs containing as coupling components o-alkoxy-aralamides of 2,3-hydroxy-naphthoic acid. This patent which refers to the above mentioned German Patent 256,999 mentions various diazo components but not 1-amino-2,4-dinitrobenzene.

The following examples illustrate the invention without, however, limiting it thereto:

*Example 1*

18.3 grams of 1-amino-2,4-dinitrobenzene are introduced into a mixture of 198 grams of sulfuric acid of 66° Bé. and 17.3 grams of nitrosyl sulfuric acid (=6.9 grams of nitrite) within half an hour at a temperature rising to 30° C. Under gradual solution the base becomes diazotized, and after pouring on 300 grams of ice and some water, it is clarified by means of a little filter charcoal.

32.3 grams of 1-(2',3'-hydroxynaphthoylamino)-2-ethoxybenzene are dissolved in 200 cc. of water and 12.4 cc. of a 44% caustic soda solution at 70° C. and then clarified. After adding an emulsifier such as alkylsulfonate of the chain-length $C_{15}$, the mixture is chilled with ice to 2° C. and the azo component is precipitated with 21 cc. of a 50% acetic acid. The diazo solution is then quickly run in, and after stirring for a longer time, the coupling is finally completed at 40° C. The coupling product is sucked off and washed neutral. The dried, Bordeaux-red pigment (48 grams) yields, when ground with oil, an excellently transparent varnish; when mixed with nitrocellulose, lacquers of good fastness to overstriping are obtained. The fastness to light of colorations of this kind is excellent.

*Example 2*

The diazo compound of 1-amino-2,4-dinitrobenzene obtained according to Example 1 is coupled, as described in that example, with 30.8 grams of 1-(2',3'-hydroxynaphthoylamino)-2-methoxybenzene having been precipitated from an alkaline solution by means of 17.7 cc. of sulfuric acid of 40° Bé. The pigment thus obtained shows practically the same good properties, however, a considerably more bluished shade than the dyestuff described in Example 1.

The coupling can also be carried out in the presence of calcined titanic dioxide or barium sulfate, and the emulsifier mentioned in Example 1 can be replaced by others such as alkylpolyglycol ether.

We claim:

1. Water insoluble monoazo dyestuffs of the general formula

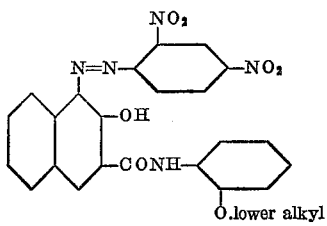

2. The water insoluble monoazo dyestuff of the formula

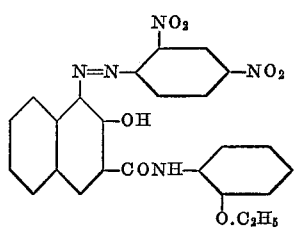

References Cited in the file of this patent

UNITED STATES PATENTS

| | | |
|---|---|---|
| Re. 19,527 | Laska et al. | Apr. 9, 1935 |
| 1,034,853 | Winther et al. | Aug. 6, 1912 |